(12) United States Patent
Stieler et al.

(10) Patent No.: US 9,157,401 B2
(45) Date of Patent: Oct. 13, 2015

(54) APPARATUS FOR COUPLING COMPONENTS OF A FUEL DELIVERY SYSTEM

(75) Inventors: David C. Stieler, Lake Orion, MI (US); Michael J. Zdroik, Metamora, MI (US); Robert J. Doherty, Syracuse, IN (US); Jackson zel Roe, Goshen, IN (US); Gary L. Handshoe, Wawaka, IN (US)

(73) Assignee: Millennium Industries, Auburn Hills, MI (US)

( * ) Notice: Subject to any disclaimer, the term of this patent is extended or adjusted under 35 U.S.C. 154(b) by 1030 days.

(21) Appl. No.: 12/353,606

(22) Filed: Jan. 14, 2009

(65) Prior Publication Data

US 2009/0179421 A1    Jul. 16, 2009

Related U.S. Application Data

(60) Provisional application No. 61/020,837, filed on Jan. 14, 2008, provisional application No. 61/093,825, filed on Sep. 3, 2008.

(51) Int. Cl.
*F02M 55/02* (2006.01)
*F02M 55/00* (2006.01)
(Continued)

(52) U.S. Cl.
CPC .......... *F02M 55/004* (2013.01); *F02M 55/005* (2013.01); *F02M 55/02* (2013.01); *F02M 37/0017* (2013.01); *F02M 2200/8084* (2013.01); *F16L 27/047* (2013.01)

(58) Field of Classification Search
CPC .................. F02M 37/0017; F02M 2200/8084; F02M 55/02; F02M 55/005; F16L 27/047

USPC ............. 123/456, 447, 468, 470; 285/148.19, 285/145.3, 328, 331; 239/600; 277/627
See application file for complete search history.

(56) References Cited

U.S. PATENT DOCUMENTS 1,870,771 A * 8/1932 De Witt ....................... 285/288.2
3,428,339 A * 2/1969 Decker et al. ................. 277/627
3,545,794 A * 12/1970 Wise et al. ..................... 285/248
(Continued)

FOREIGN PATENT DOCUMENTS

DE         199 36 535 A1    2/2001
DE     10 2005 045731 A1    4/2007
(Continued)

OTHER PUBLICATIONS

Machine translation of Bretag et al. (DE 10 2005 045 731 A1); DE102005045731_MT.pdf.*
(Continued)

*Primary Examiner* — Mahmoud Gimie
*Assistant Examiner* — David Hamaoui
(74) *Attorney, Agent, or Firm* — Dykema Gossett PLLC (57) ABSTRACT

An apparatus for coupling components in a fuel delivery system together is presented. The apparatus comprises a first member having a first end, a second end, and throughgoing passageway therebetween. The apparatus further comprises a second member having a throughgoing bore therein. The throughgoing bore is configured to receive the first end of the first member. The first and second members of the apparatus are configured to be affixed together to create a joint between the first end of the first member and the inner wall of the bore of the second member such that the passageway and the bore are in substantial alignment with each other.

22 Claims, 6 Drawing Sheets (51) Int. Cl.
*F02M 37/00* (2006.01)
*F16L 27/047* (2006.01)

(56) References Cited

U.S. PATENT DOCUMENTS

| | | | |
|---|---|---|---|
| 3,596,933 A * | 8/1971 | Luckenbill | 285/94 |
| 3,679,239 A * | 7/1972 | Schmitt | 285/148.22 |
| 3,861,719 A * | 1/1975 | Hand | 285/47 |
| 4,032,177 A * | 6/1977 | Anderson | 285/24 |
| 4,062,572 A * | 12/1977 | Davis | 285/55 |
| 4,133,565 A | 1/1979 | Shutt | |
| 4,188,051 A * | 2/1980 | Burge | 285/104 |
| 4,220,358 A * | 9/1980 | Gaffney | 285/242 |
| 4,295,452 A | 10/1981 | Lembke et al. | |
| 4,427,219 A * | 1/1984 | Madej | 285/249 |
| 4,539,959 A | 9/1985 | Williams | |
| 4,693,223 A | 9/1987 | Eshleman et al. | |
| 4,705,306 A | 11/1987 | Guido et al. | |
| 4,712,813 A * | 12/1987 | Passerell et al. | 285/250 |
| 5,154,453 A * | 10/1992 | Nishio | 285/342 |
| 5,261,705 A * | 11/1993 | Takahashi et al. | 285/197 |
| 5,286,070 A | 2/1994 | Williams | |
| 5,511,830 A * | 4/1996 | Olson et al. | 285/243 |
| 5,580,100 A * | 12/1996 | Umezawa et al. | 285/39 |
| 5,658,022 A * | 8/1997 | Shi et al. | 285/148.23 |
| 5,709,337 A * | 1/1998 | Moser et al. | 228/124.6 |
| 5,765,534 A | 6/1998 | Brown et al. | |
| 5,775,302 A | 7/1998 | Guido et al. | |
| 5,957,507 A | 9/1999 | Asada | |
| 5,979,945 A | 11/1999 | Hitachi et al. | |
| 5,992,904 A | 11/1999 | Hitachi et al. | |
| 6,045,162 A | 4/2000 | Haibara | |
| 6,070,618 A * | 6/2000 | Iwabuchi | 138/143 |
| 6,186,121 B1 | 2/2001 | Uematsu et al. | |
| 6,318,341 B1 | 11/2001 | Gmelin et al. | |
| 6,374,805 B1 | 4/2002 | Seymour, II et al. | |
| 6,374,806 B1 | 4/2002 | Keeley et al. | |
| 6,415,768 B1 * | 7/2002 | Usui | 123/468 |
| 6,435,568 B1 * | 8/2002 | Fukano et al. | 285/331 |
| 6,463,909 B2 * | 10/2002 | Asada et al. | 123/456 |
| 6,494,183 B2 | 12/2002 | Usui et al. | |
| 6,543,421 B2 | 4/2003 | Lorraine et al. | |
| 6,637,776 B2 | 10/2003 | Tikk et al. | |
| 6,736,431 B2 * | 5/2004 | Jung et al. | 285/288.1 |
| 6,830,035 B2 | 12/2004 | Nishiwaki et al. | |
| 6,848,424 B2 | 2/2005 | Watanabe | |
| 6,874,477 B1 | 4/2005 | Lorraine et al. | |
| 6,959,695 B2 | 11/2005 | Warner et al. | |
| 6,981,722 B2 * | 1/2006 | Watanabe | 285/353 |
| 7,114,489 B2 | 10/2006 | Wenke et al. | |
| 7,137,652 B2 | 11/2006 | Kondo et al. | |
| 7,159,570 B2 | 1/2007 | Zdroik | |
| 7,204,234 B2 * | 4/2007 | Morita | 123/468 |
| 7,275,521 B2 * | 10/2007 | Usui et al. | 123/468 |
| 7,461,636 B2 * | 12/2008 | Ricco et al. | 123/456 |
| 7,516,735 B1 * | 4/2009 | Doherty et al. | 123/468 |
| 8,038,178 B2 * | 10/2011 | Badarinarayan et al. | 285/288.1 |
| 8,555,858 B2 * | 10/2013 | Badarinarayan et al. | 123/468 |
| 2001/0037796 A1 | 11/2001 | Lorraine et al. | |
| 2004/0094127 A1 | 5/2004 | Watanabe | |
| 2006/0284421 A1 * | 12/2006 | Fonville et al. | 285/386 |

FOREIGN PATENT DOCUMENTS

| | | |
|---|---|---|
| EP | 1 600 626 A1 | 11/2005 |
| GB | 2 045 376 A | 10/1980 |

OTHER PUBLICATIONS

International Search Report and Written Opinion of the International Searching Authority for App. No. PCT/US2009/030946 mailed May 29, 2009.

* cited by examiner

APPARATUS FOR COUPLING COMPONENTS OF A FUEL DELIVERY SYSTEM

CROSS REFERENCE TO RELATED APPLICATIONS

This application claims the benefit of U.S. Provisional Application Ser. No. 61/020,837 entitled "Simplified High Pressure Fitting," which was filed on Jan. 14, 2008, and U.S. Provisional Application Ser. No. 61/093,825 entitled "High Pressure Connection for Fuel Injector in Fuel Delivery System," which was filed on Sep. 3, 2008. Both of these provisional applications are hereby incorporated by reference in their entireties.

FIELD OF THE INVENTION

The field of the present invention is fuel delivery systems. More particularly, the present invention relates to an apparatus for coupling together components of a gasoline direct injection fuel delivery system.

BACKGROUND OF THE INVENTION

Fuel delivery systems for direct injection applications, such as, for example, fuel-injected engines used in various types of on-road and off-road vehicles, typically include a fuel source, one or more fuel rails and a plurality of fuel injectors associated with the fuel rail(s). In such applications, the fuel rail may include a plurality of apertures in which injector sockets or cups are affixed. The fuel injectors are then inserted into and coupled with the injector cups so as to allow for the fuel flowing from the fuel source to the fuel rail to be communicated to the fuel injectors. The fuel communicated to the fuel injectors is then communicated to the combustion chamber of the engine.

One drawback of such direct injection systems, however, is the amount of pressure attendant in the system (i.e., on the order of 10 MPa or more). This pressure results in a relatively large amount of force and different twisting or bending moments being applied to the components of the system, and the connections or couplings therebetween. Consequently, various types of coupling arrangements designed to withstand the pressure/force of these systems have been utilized for coupling the system components together (e.g., coupling the fuel source to fuel rail, a fuel rail to another fuel rail, and/or a fuel injector to the fuel rail). However, while generally proving adequate with respect to withstanding the pressure/force in the system, these arrangements have not been without their respective disadvantages.

For instance, with respect to the coupling of a fuel injector with the fuel rail, in one arrangement, the fuel injector is coupled directly to the fuel rail and sandwiched between the fuel rail and the cylinder head of the engine. In this arrangement, undesirable noise can be generated. One prior attempt at eliminating or at least reducing this noise has included suspending the injector from the fuel rail. In one such arrangement an O-ring seal and a fuel injector clip are used to seal the connection between the fuel rail and fuel injector, and to hold and retain the injector in the correct position, respectively. Accordingly, the sealing and retention functions are performed separately. While such an arrangement may reduce the noise in the system, it requires additional components (e.g., the O-ring and the clip), which in turn increases the cost of the overall system and makes the corresponding manufacturing process more difficult.

With respect to the coupling of two fuel rails together, or coupling the inlet of a fuel rail with the outlet of a fuel source, metal-to-metal high pressure tube fittings have been utilized. These fittings generally include a tubular member having a spherical, cone, or ball shaped member (so-called male fitting) affixed to either one or both ends of the tube, and a threaded nut that circumscribes and slides along the length of the tubular member. The threaded nut is configured for mating with a complementary threaded portion disposed on either a fuel rail inlet or a fuel source outlet. One drawback of these conventional fittings is that the ball member typically requires a machined shank that results in a thin cross-section at the point of attachment between the tubular member and the ball member. While such an arrangement is generally able to withstand the pressure in the system, because the shank has been required, additional machining operations and material, and therefore, cost and difficulty have to be added to the manufacturing process. Additionally, the attachment point between the tubular member and the ball member may have a reduced strength due to the reduced cross-section of the shank.

Therefore, there is a need for a coupling apparatus for high pressure fuel delivery systems that will minimize and/or eliminate one or more of the above-identified deficiencies.

SUMMARY OF THE INVENTION

The present invention is directed to a fuel delivery system, and more particularly, to an apparatus for coupling components of the fuel delivery system together. The apparatus comprises a first member having a first end, a second end, and throughgoing passageway therebetween. The apparatus further comprises a second member having a throughgoing bore therein. The throughgoing bore is configured to receive the first end of the first member. In another exemplary embodiment, the apparatus may include two of the second members (or a second and a third member), with the bore of a first second member being configured to receive the first end of the first member, and the bore of the other second member being configured to receive the second end of the first member. Whether there are one or two second members, the first and second members of the apparatus are configured to be affixed together to create a joint between therebetween such that the bore(s) of the second member(s) are in substantial alignment with the passageway of the first member.

Further features and advantages of the present invention will become more apparent to those skilled in the art after a review of the invention as it is shown in the accompanying drawings and detailed description.

DETAILED DESCRIPTION OF PREFERRED EMBODIMENTS

Figures 1, 2A, 2B:
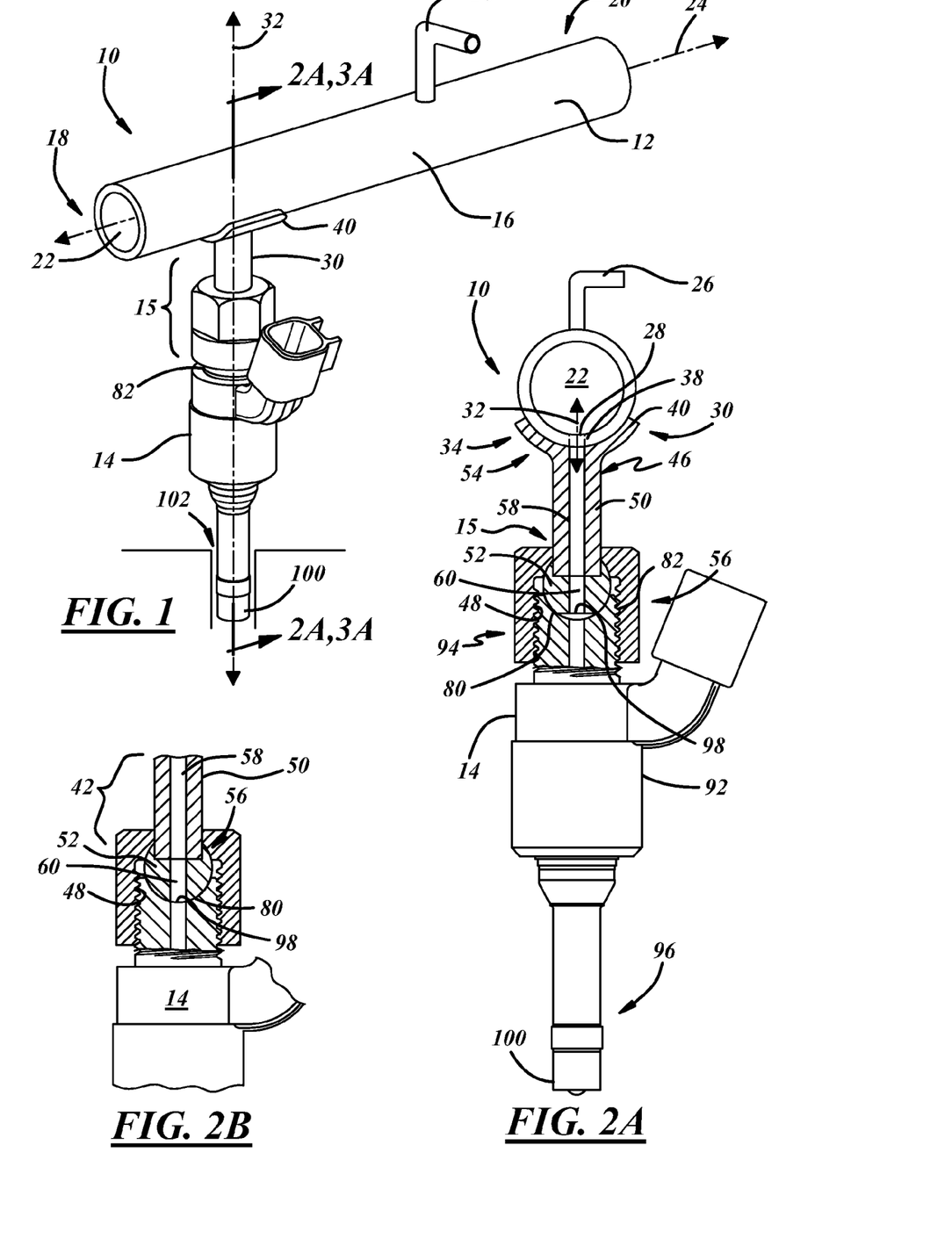
FIG. 1 is a perspective view of an exemplary embodiment of a fuel delivery system in accordance with the present invention.
FIG. 2A is a side cross-section view of the fuel delivery system of FIG. 1 taken along lines 2A-2A of FIG. 1.
FIG. 2B is an enlarged view of a portion of the fuel delivery system of FIG. 2A.

Referring now to the drawings wherein like reference numerals are used to identify identical components in the various views, FIG. 1 illustrates one exemplary embodiment of fuel delivery system 10. Fuel delivery system 10 generally includes a fuel source 11 (shown in FIG. 9), a fuel rail 12, and a fuel injector 14. Fuel delivery system 10 further includes one or more coupling apparatuses, or couplers 15, that are configured to couple two components of the fuel system together. For example, in the exemplary embodiment illustrated in FIG. 1, coupler 15 is configured to couple fuel injector 14 with fuel rail 12. In another exemplary embodiment wherein fuel system 10 includes two fuel rails 12, coupler 15 is configured to couple the two fuel rails together. In yet another exemplary embodiment illustrated, for example, in FIG. 8, coupler 15 is configured to couple fuel source 11 with fuel rail 12. Accordingly, various embodiments of coupler 15 may be used in a variety of ways including, but not limited to, those identified above that will be described in greater detail below.

With continued reference to FIG. 1, a fuel delivery system 10 is illustrated wherein an exemplary embodiment of coupler 15 is configured to couple fuel injector 14 with fuel rail 12. Fuel rail 12 includes a body 16 having a first end 18, a second end 20, and a fluid passageway 22 extending therebetween. Body 16 further defines a longitudinal axis 24 extending therethrough from first end 18 through second end 20. In the illustrated exemplary embodiment, fuel rail 12 is of a one-piece construction having a circular cross-section. It should be noted, however, that the present invention is not meant to be so limited. Rather, in alternate embodiments, fuel rail 12 may be formed of multiple pieces and/or have a number of different cross-sectional shapes (e.g., rectangular, triangular, square, etc.). Additionally, fuel rail 12 may be formed of one or more types of materials. In one exemplary embodiment, fuel rail 12 is formed of metal, such as, for example, stainless steel. It should be noted, however that other metallic materials may also be used, such as, for exemplary purposes only, aluminum or aluminum alloy. Alternatively, fuel rail 12 may be formed of materials other than, or in addition to, metal. For example, in an exemplary embodiment, fuel rail 12 is formed of a thermoplastic material, or a combination of thermoplastic and metal (e.g., a polymer coated aluminum tube).

Figure 3A:
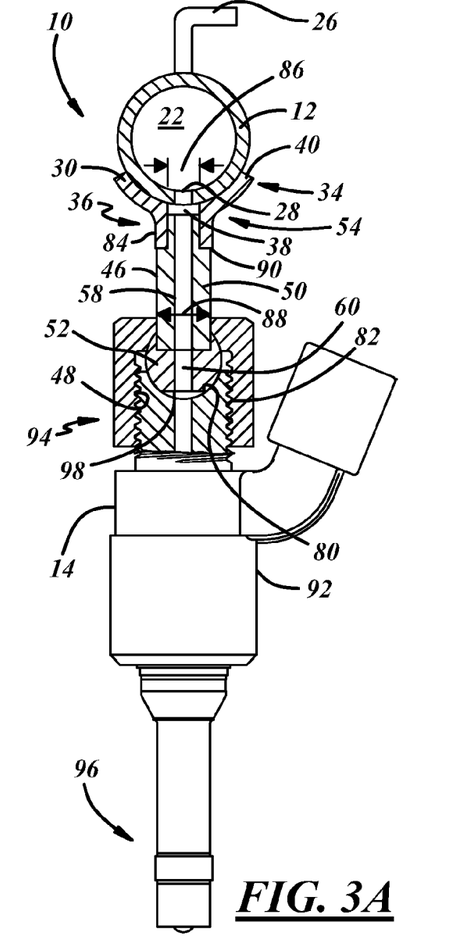
FIG. 3A is a side cross-section view of another exemplary embodiment of the fuel delivery system illustrated in FIGS. 2A and 2B taken along the lines 3A-3A of FIG. 1.

With continued reference to FIG. 1, fuel rail 12 further includes an inlet 26 and at least one feed outlet 28 (best shown in FIGS. 2A and 3A). In an exemplary embodiment, fuel system 10 may further include at least one receptor 30 associated with each feed outlet 28 that extends out and away from the outer surface of fuel rail 12 and that is configured to couple or mate fuel rail 12 with a fuel injector 14.

Inlet 26 is configured for connection to fuel source 11, such as, for example, a fuel tank or a fuel pump of a vehicle, in order to communicate fuel from fuel source 11 to fuel rail 12, and fluid passageway 22, in particular.

Feed outlet 28, which, in an exemplary embodiment, comprises an aperture in fuel rail body 16 and defines an axis 32 extending therethrough that is perpendicular to axis 24 of fuel rail 12, is configured to be in fluid communication with the inlet of a corresponding fuel injector 14 to allow fuel in fuel rail 12 to be communicated to fuel injector 14, and ultimately, the engine associated with fuel delivery system 10. In an exemplary embodiment, fuel rail 12 includes a plurality of feed outlets 28 (and therefore, a corresponding number of receptors 30) so as to provide fuel to a number of fuel injectors 14. However, for the sake of simplicity alone, fuel delivery system 10 will be described hereinafter as having a single feed outlet 28, and therefore, a single fuel injector 14.

As briefly described above, and with particular reference to FIGS. 2A and 2B, in an exemplary embodiment, fuel delivery system 10 includes a receptor 30 associated with feed outlet 28. Receptor 30 may be formed of any number of suitable materials, such as, for example, metal (e.g., stainless steel, aluminum, aluminum alloy, etc.) and/or thermoplastic. Receptor 30 includes a proximal end 34 located proximate to feed outlet 28, and a distal end 36 located out and away from rail 12. In one exemplary embodiment, receptor 30 further includes an opening 38 therein. Opening 38 is configured to be aligned with feed outlet 28 so that, as will be described in greater detail below, the fuel in passageway 22 can be communicated to the inlet of fuel injector 14 associated with receptor 30.

In an exemplary embodiment, receptor 30 is integrally or unitarily-formed with fuel rail 12. However, in another exemplary embodiment, receptor 30 is configured to be mounted or otherwise affixed to fuel rail 12. In the latter embodiment, receptor 30 may include a mounting flange 40 that may be affixed to rail 12 by way of conventional methods, such as, for example, various brazing or welding processes. Although not necessarily required, in an exemplary embodiment, flange 40 is sized and shaped to match the particular contour of the outer surface of rail body 16. Accordingly, in an embodiment wherein fuel rail 12 has a circular cross-section, flange 40 has a saddle or arcuate shape. Alternatively, however, flange 40 may have a rectangular or square shape when fuel rail 12 has a corresponding rectangular or square cross-section. Accordingly, those of ordinary skill in the art will recognize that flange 40 may have many different shapes depending on the particular cross-section of fuel rail 12. In an alternate exemplary embodiment, receptor 30 does not include flange 40, but rather is otherwise directly affixed to the outer surface of rail body 16 using known affixation methods (e.g., brazing, welding, and/or other suitable processes).

In addition to the components described above, fuel delivery system 10 further includes coupler 15. In this embodiment, coupler 15 is a first feature 42 of fuel system 10 and is associated with either one of fuel injector 14 and fuel rail 12. For ease of explanation purposes, coupler 15 will hereinafter be described as first feature 42 with respect to this particular embodiment of fuel delivery system 10/coupler 15. In such an embodiment, fuel system 10 further includes a second feature 44 that is associated with the other one of fuel injector 14 and fuel rail 12. First and second features 42, 44 are complementary to each other and are configured to create a seal between fuel rail 12 and fuel injector 14, as well as to couple and retain fuel rail 12 and fuel injector 14 together.

In an exemplary embodiment illustrated, for example, in FIG. 2A, first feature 42 includes a fuel injector supporting member 46 and a threaded portion 48. With reference to FIGS. 2A and 2B, supporting member 46, which may be formed of any number of materials, such as, for example, stainless steel, aluminum, thermoplastics, or other suitable materials, includes a first member 50 and a second member 52.

Figure 14:
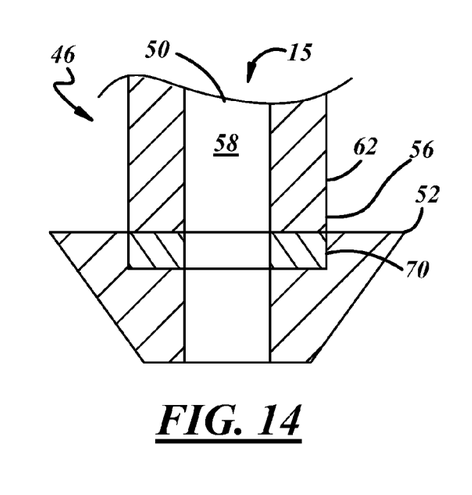
FIGS. 14 and 15 are cross-section views of additional exemplary embodiments of the coupling apparatus illustrated in FIGS. 4-5B.
Figure 15:
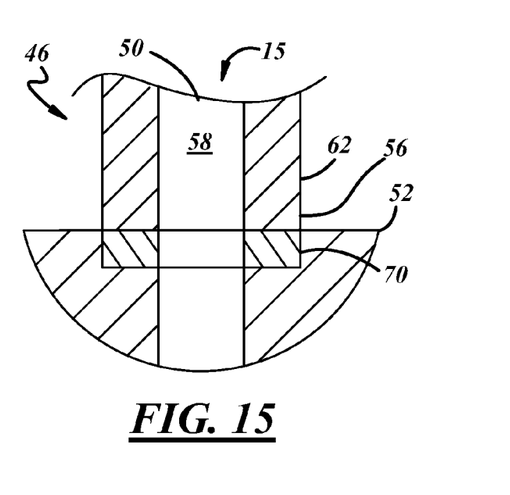

First member 50, which, in an exemplary embodiment, has a tubular shape, has a first end 54, which is a proximal end in this embodiment (best shown in FIGS. 2A and 3A), a second end 56, which is a distal end in this embodiment, and a throughgoing passageway 58 extending therebetween. Second member 52, which, in an exemplary embodiment has a spherical shape, has a throughgoing bore 60. It should be noted that while the description herein is directed to second member 52 having a spherical shape, the present invention is not meant to be so limited. Rather, in other exemplary embodiments, second member 52 may have an alternate shape such as, for exemplary purposes only, a conical shape (See FIG. 14) or a hemispherical shape (See FIG. 15). Accordingly, the present invention is not limited to second member 52 having one particular shape, but rather those of ordinary skill in the art will recognize that second member 52 may take any number of shapes and remain within the spirit and scope of the present invention.

Figure 4:
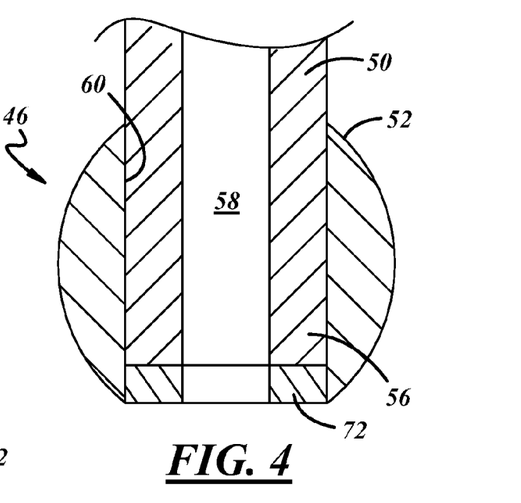
FIG. 4 is a cross-section view of an exemplary embodiment of a coupling apparatus of the fuel delivery system illustrated in FIGS. 2A-3B.

Throughgoing bore 60 is configured to receive the distal end 56 of first member 50 when first and second members 50, 52 are assembled together. In an exemplary embodiment illustrated in FIG. 4, bore 60 has a constant diameter throughout its length. However, with reference to FIG. 5A, in another exemplary embodiment, bore 60 comprises a first portion 62 and a second portion 64. First portion 62 has a first diameter 66, and second portion 64 has a second diameter 68 that is smaller than first diameter 66. In such an embodiment, first portion 62 defines a seat 70 configured to receive distal end 56 of first member 50. For the sake of simplicity of explanation only, the present invention will be described hereinafter with respect to the embodiment wherein bore 60 has first and second portions 62, 64 having first and second diameters 66, 68. However, while the following description is directed specifically to such an embodiment, it applies with equal force, where appropriate, to the embodiment described above wherein bore 60 has a constant diameter throughout.

Accordingly, first member 50 and second member 52 are configured to be assembled and, as will be described in greater detail below, affixed together to create a rigid joint therebetween, and distal end 56 of first member 50 and the inner wall of bore 60 of second portion 52, in particular. When first and second members 50, 52 are assembled together, passageway 58 and bore 60 are in substantial alignment with each other such that, as will be described below, fuel may be communicated from feed outlet 28 to fuel injector 14 through passageway 58 and bore 60.

Figure 5A:
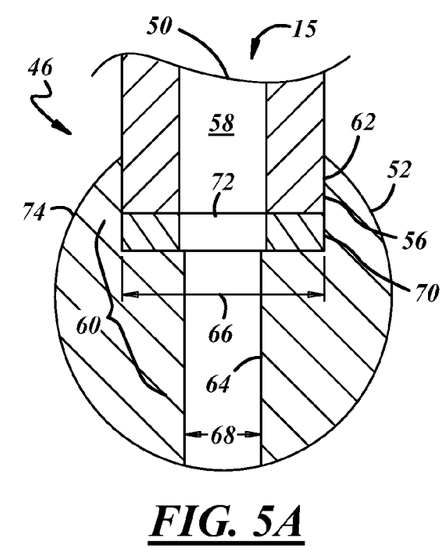
FIGS. 5A and 5B are cross-section views of additional exemplary embodiments of the coupling apparatus illustrated in FIG. 4.

In an exemplary embodiment, first and second members 50, 52 are configured to be affixed together using known methods, such as, for example, various brazing or welding processes. With reference to FIG. 5A, in an embodiment wherein first and second members 50, 52 are brazed together, supporting member 46 further includes a brazing preform 72. Preform 72 is configured to be disposed within bore 60 at a position that is proximate where distal end 56 of first member 50 would be disposed when it is inserted within bore 60. In an embodiment wherein bore 60 includes seat 70, preform 72 may be disposed in the bottom of seat 70. Preform 72 is configured and operative to affix distal end 56 and the inner surface of bore 60 together when a brazing operation is performed on the assembled components. Additionally, second member 52 has an outer surface 74 that acts as a sealing surface. In an exemplary embodiment illustrated, for example, in FIG. 5B, second member 52 may also include a chamfer 76 formed in outer surface 74 proximate bore 60. Chamfer 76 is provided to act as a braze dam to prevent, or at least substantially limit, the amount of brazing material that may migrate onto outer surface 74, and therefore, onto the sealing surface of second member 52.

By second member 52 (i.e., ball or spherical form) receiving first member 50 (i.e., tubular form), the present invention eliminates the need for the shank and machining corresponding thereto that is required in conventional ball-style fittings.

Figure 5B:
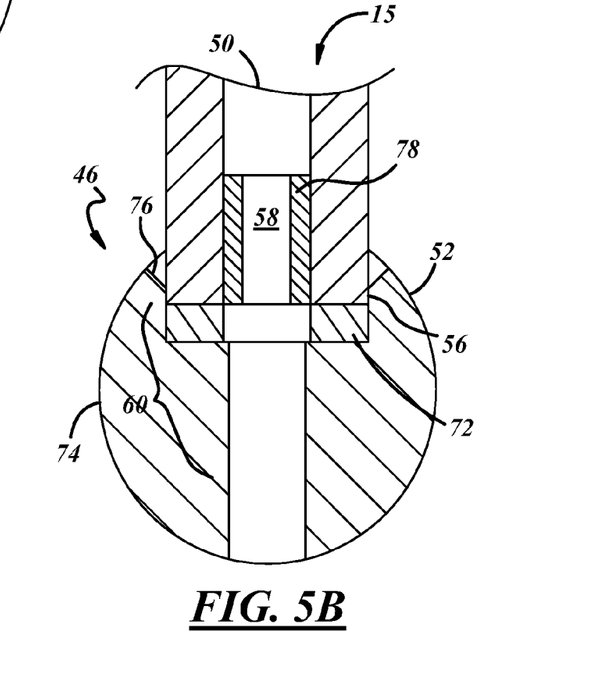
Figure 5C:
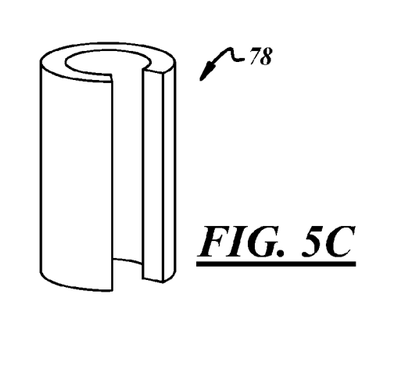
FIG. 5C shows an insert sleeve.

With continued reference to FIGS. 5B and 5C, for example, in an exemplary embodiment, supporting member 46 may further comprise an insert sleeve 78. Insert sleeve 78 is configured to be inserted within passageway 58 of first member 50 and is operative to further strengthen and/or reinforce the joint between first and second members 50, 52. In particular, a high stress point exists at a corner formed where the outer diameter of the first member 50 and the outer surface of the second member 52 meet. Disposing the insert sleeve 78 in the passageway 58 improves the strength by reinforcing the joint, for example locally at the above-noted stress point. Accordingly, passageway 58 has a diameter that is sized to allow sleeve 78 to be inserted therein. In an embodiment, the insert sleeve 78 extends along axis 32 beyond the above-mentioned corner in a direction toward the proximal end 54 of first member 50. In an exemplary embodiment, sleeve 78 is further configured to be affixed to the inner surface of passageway 58. In such an embodiment, sleeve 78 may be coated with a brazing material, such as, for example, copper. Additionally, in an embodiment wherein supporting member 46 includes brazing preform 72, sleeve 78 may be positioned within passageway 58 such that it is in contact with or close proximity to preform 72.

Sleeve 78 may take on any number of constructions and be formed of any number of materials. For instance, in an exemplary embodiment illustrated in FIG. 5C, sleeve 78 comprises a split-tube or roll pin construction. In such an embodiment, the split-nature of the construction allows for its diameter to vary which in turn allows for a precise fit and tight tolerance within passageway 58. Sleeve 78 may be made of any number of materials, and in an exemplary embodiment, is formed of a metallic material (e.g., stainless steel).

Turning back now to FIGS. 2A and 2B, and as described above, first feature 42 includes a threaded portion 48. In the illustrated embodiment, threaded portion 48 comprises a threaded nut that circumscribes, is slidable along, and is rotatable about supporting member 46, and first member 50 thereof, in particular. For ease of description purposes, the threaded portion of first feature 42 and the nut that comprises this portion in this particular embodiment will be referenced hereinafter interchangeable as either threaded portion 48 or nut 48. Nut 48 is retained on first member 50 by second portion 52, thereby preventing nut 48 from sliding off of supporting member 46.

With respect to second feature 44, in an exemplary embodiment illustrated, for example, in FIG. 5, second feature 44 includes a seat 80 and a threaded portion 82. As briefly described above, first and second features 42, 44 are complementary with each other. Accordingly, seat 80 is sized and shaped to receive at least part of second member 52, and threaded portion 82 is configured to mate with threaded portion 48 of first feature 42. More particularly, in the illustrated embodiment, seat 80 is a conical seat sized to receive spherically-shaped second member 52, thereby creating a constant line of contact between second member 52 and seat 80; and threaded portion 82 of second feature 44 is configured to be mated with the inner threaded surface of nut 48 (i.e., the threaded portion of first feature 42) so as to create a compression fitting therebetween.

In an exemplary embodiment, first feature 42 is associated with fuel rail 12 and second feature 44 is associated with fuel injector 14. More specifically, proximal end 54 of first member 50 of supporting member 46 is associated with fuel rail 12 proximate feed outlet 28. Proximal end 54 may be unitarily formed with fuel rail body 16, or alternatively, may be a separate and distinct component that is affixed thereto using known methods, such as, for example, various brazing and welding processes. In another exemplary embodiment, proximal end 54 may not be associated directly with fuel rail body 16, but rather may be unitarily-formed with, or configured to be coupled with and/or affixed to receptor 30. As described elsewhere herein, receptor 30, in turn, may be unitarily-formed with or affixed to fuel rail 12.

It should be noted that while the foregoing description is directed to an embodiment wherein first feature 42 is associated with fuel rail 12, the present invention is not meant to be limited to such an arrangement. Rather, in another exemplary embodiment, first feature 42 is associated with fuel injector 14 rather than fuel rail 12. In such an embodiment, first member 50 of supporting member 46, and proximal end 54 thereof, in particular, is associated with the body of fuel injector 14 (i.e., unitarily-formed with or affixed to the injector body). In such an embodiment, second feature 44 is associated with fuel rail 12, and either body 16 thereof and/or receptor 30, in particular. However, for the sake of simplicity alone, the following description of the present invention will be described solely with respect to the embodiment wherein first feature 42 is associated with fuel rail 12, and second feature 44 is associated with fuel injector 14. Such a description is provided for exemplary purposes only and is not meant to be limiting in nature. Those of ordinary skill in the art will appreciate that the following description applies with equal force to an embodiment wherein first feature 42 is associated with fuel injector 14 and second feature 44 is associated with fuel rail 12.

In the particular embodiment illustrated in FIGS. 2A and 2B, supporting member 46 of first feature 42 and receptor 30 are integrally formed together. Therefore, rather than being separate and distinct components, as is the case in the embodiment illustrated in FIG. 3A and described below, receptor 30 and supporting member 46 are of a unitary construction. In this embodiment, opening 38 in receptor 30 and passageway 58 in supporting member 46 (and first member 50 thereof, in particular) are combined as one, such that there is a single channel extending through the entire length of the receptor 30/supporting member 46 combination. Accordingly, as described above with respect to opening 38, when assembled with fuel rail 12, the combination of passageway 58/opening 38 and bore 60 are aligned with feed outlet 28 such that fuel can be communicated between fuel rail 12 and an injector associated with the combined receptor 30/supporting member 46 structure. As depicted in FIG. 2A, in this embodiment, flange 40 is configured to mount the combination of receptor 30 and supporting member 46 to fuel rail body 16. Additionally, because first feature 42 is associated with receptor 30, the nut comprising the threaded portion 48 of first feature 42 is also associated with receptor 30, and is configured to slide along first member 50 of supporting member 46 from receptor 30 to distal end 56 of first member 50.

Figure 3B:
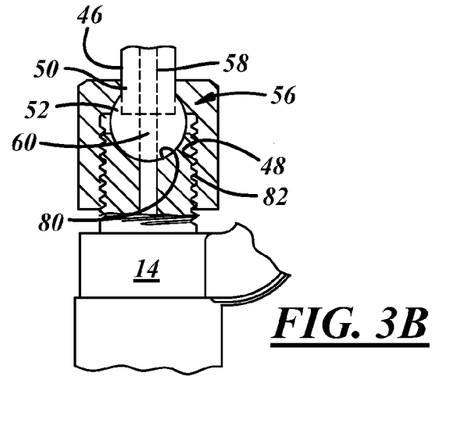
FIG. 3B is an enlarged view of a portion of the fuel delivery system of FIG. 3A.

In an alternate embodiment illustrated in FIG. 3A, receptor 30 and supporting member 46 of first feature 42 are separate and distinct components. In this embodiment, in addition to opening 38 and flange 40, receptor 30 includes a cup portion 84 that is integral with flange 40 and that has an inner diameter 86 and an outer diameter 88 that is greater than inner diameter 86. As illustrated in FIGS. 3A and 3B, at least a portion of first member 50 at proximal end 54 thereof has an outer diameter that is substantially equal to or slightly less than inner diameter 86 of cup 84. In an exemplary embodiment, first member 50 may include a second portion that has a second outer diameter that is greater than the first outer diameter and substantially equal to the outer diameter 88 of cup 84. Accordingly, regardless of whether first member 50 has a constant outer diameter throughout its length or different portions having different outer diameters, at least a portion of first member 50 is sized and shaped so as to be inserted into and received by cup portion 84. When first member 50 is inserted into cup 84, outlet 28, opening 38, passageway 58, and bore 60 are all aligned such that the fuel in fuel rail 12 can be communicated from fuel passageway 12 to the injector associated with supporting member 46.

With continued reference to FIG. 3A, in an embodiment wherein first member 50 includes first and second portions having differing outer diameters, first member 50 further includes a shoulder 90 disposed at the point on first member 50 where the outer diameter thereof changes from the first outer diameter to the second outer diameter. Shoulder 90 is configured to abut and engage the outer rim of cup portion 84 once proximal end 54 of first portion 50 is inserted into cup 84. During the assembly process of this embodiment of fuel delivery system 10, the contact region between shoulder 90 and the rim of cup portion 84 is brazed or welded together using known processes to seal the joint therebetween. In an exemplary embodiment, this brazing/welding process is done at the same time flange 40 is brazed/welded to fuel rail body 16. However, in other exemplary embodiments, first portion 50 is affixed to cup 84 prior to or following the affixation of flange 40 to fuel rail 12. Additionally, because first feature 42 is associated with receptor 30, the nut comprising the threaded portion 48 of first feature 42 is also associated with receptor 30, and is configured to slide along first member 50 of first feature 42 from receptor 30 to distal end 56 of first member 50. Accordingly, other than being separate components that are assembled together, this embodiment of receptor 30 and first feature 42 is the same as the embodiment wherein supporting member 46 of first feature 42 is integrally formed with receptor 30.

Figure 6:
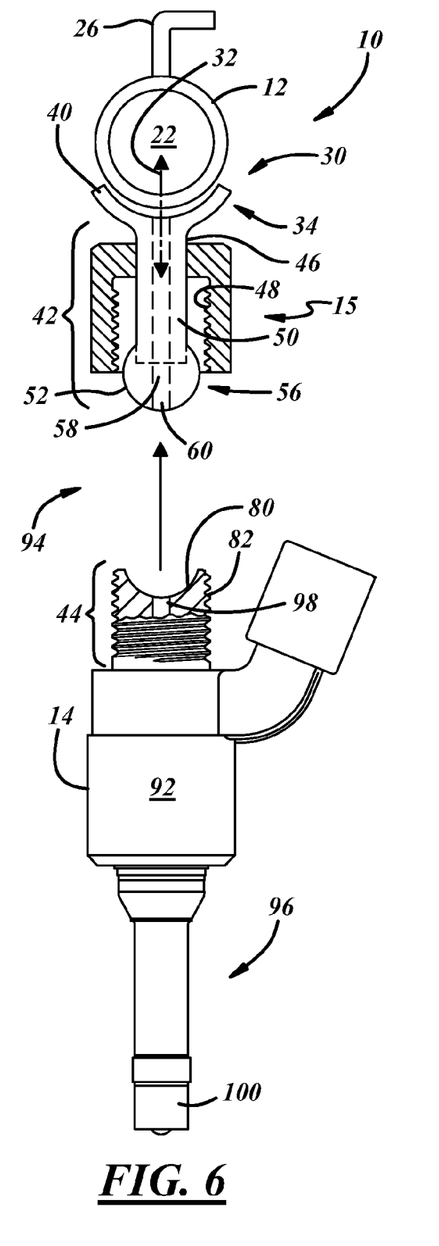
FIG. 6 is an exploded view of the fuel delivery system illustrated in FIGS. 1-3B.

In the embodiment wherein first feature 42 is associated with fuel rail 12, second feature 44 is associated with injector 14. As illustrated in FIG. 6, injector 14 includes a body 92 disposed between a first end 94 and a second end 96 opposite first end 94. Injector 14 further includes an inlet 98 disposed at first end 94, an outlet 100 disposed at second end 96, and defines a longitudinal axis extending through inlet 98 and outlet 100. As briefly described above, second feature 44 includes a seat 80 and a threaded portion 82. In this embodiment, seat 80 and threaded portion 82 are both formed/disposed in injector body 92 at first end 94. More particularly, seat 80 is disposed in such a location that inlet 98 is disposed within seat 80. Inlet 98 is configured to be in fluid communication with feed outlet 28 of fuel rail 12, and therefore, passageway 58 of first member 50 and bore 60 of second member 52, such that fuel in passageway 22 can be communicated to injector 14. Accordingly, as will be described in greater detail below, when fuel delivery system 10 is assembled, inlet 98 is axially aligned and in fluid communication with feed outlet 28, passageway 58, and bore 60. Fuel injector outlet 100, on the other hand, is configured for communication with a combustion chamber 102 of an engine associated with fuel delivery system 10 (See FIG. 1). Accordingly, outlet 100 communicates fuel received at inlet 98 to combustion chamber 102. In an assembled state, therefore, the longitudinal axis of injector 14 is coincident to axis 32 of fuel outlet 28, and normal to axis 24 of fuel rail 12. Thus, fuel injector 14 is axially aligned with both combustion chamber 102 and feed outlet 28.

Figure 7:
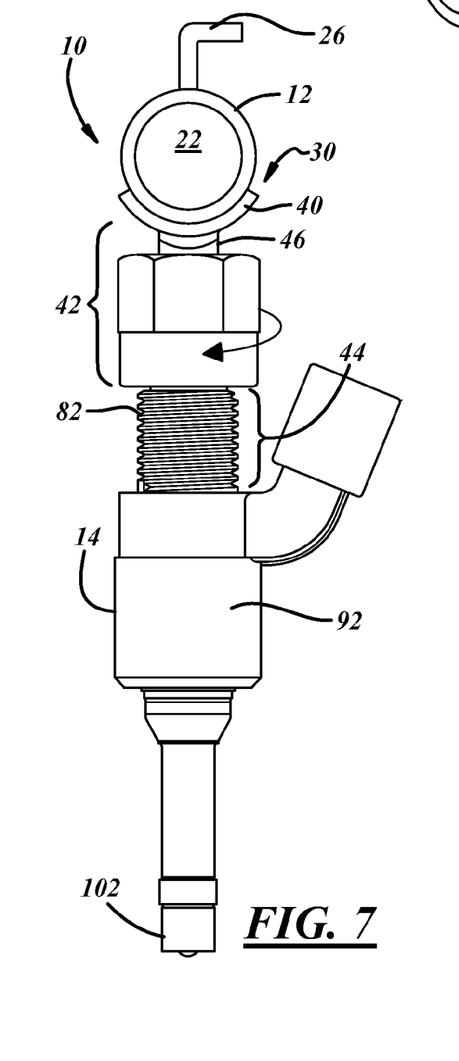
FIG. 7 is a side elevational view of the fuel delivery system of FIG. 1 during an initial stage of assembly.
Figure 8:
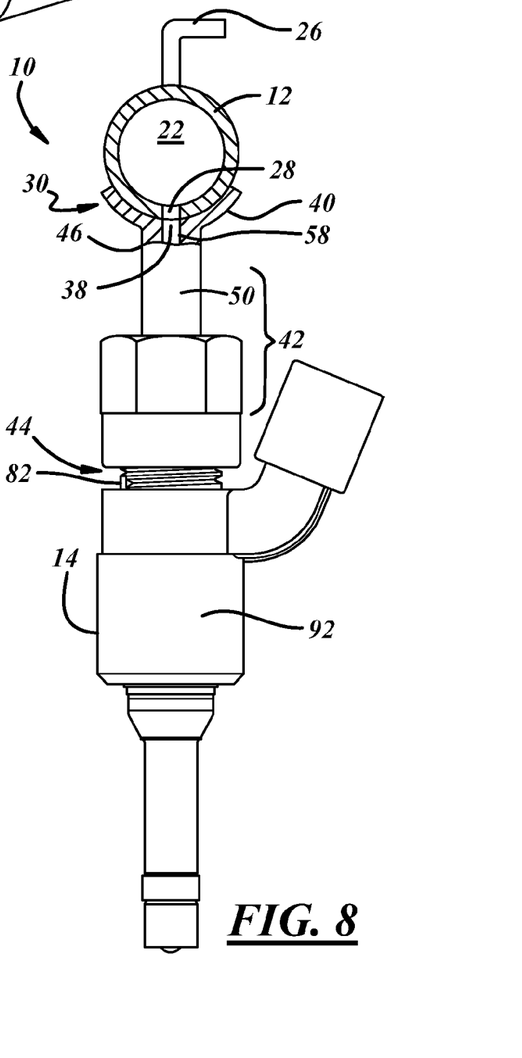
FIG. 8 is a side elevational view of the fuel delivery system of FIG. 1 in a final assembled state.

With reference to FIGS. 6-8, the assembly of this embodiment of fuel delivery system 10 and the mating of first and second features 42, 44 will be described. First, if appropriate, receptor 30 and supporting member 46 of first feature 42 are assembled together and mounted to fuel rail body 12. Next, seat 80 of second feature 44 is aligned with injector supporting member 46, and second member 52 thereof, in particular, (best shown in FIG. 6). As briefly described above, seat 80 is complementary to the shape of second member 52. The size and shape of seat 80 is dependent upon the size and shape of second member 52, and vice versa. Therefore, seat 80 is sized and shaped to receive at least a portion of second member 52. Accordingly, in the embodiment illustrated in FIG. 6 wherein second member 52 of supporting member 46 has a spherical shape, seat 80 has a complementary conical shape. In such an embodiment, seat 80 has substantially the same diameter as spherically shaped second member 52 such that there is a constant line of contact along substantially the entire surface of conical seat 80.

With continued reference to FIGS. 6-8, once seat 80 is aligned with supporting member 46 such that injector inlet 98 is aligned with passageway 58 and bore 60, injector 14 is engaged/coupled with injector supporting member 46. With reference to FIGS. 7 and 8, once injector 14 and supporting member 46 are properly engaged/coupled, nut 48 of first feature 42 is then slid down to second member 52 of supporting member 46 and threaded onto threaded portion 82 of second feature 44. When the respective threaded portions 48, 82 of first and second features 42, 44 are mated together, first and second features 42, 44 cooperate to suspend injector 14 from fuel rail 12 such that injector 14 is not sandwiched between fuel rail 12 and a corresponding cylinder head of an engine. Additionally, the combination of the close-fit engagement between spherically shaped second member 52 and seat 80, and the mating of threaded portions 48, 82 further serves to create a tight seal between injector 14 and fuel rail 12, and a rigid connection therebetween.

As discussed above, while the description set forth above provides that first feature 42 is associated with receptor 30 and/or fuel rail 12, and second feature 44 is associated with injector 14, one of ordinary skill in the art will recognize and appreciate that the features may be reversed such that first feature 42 is associated with injector 14, while second feature 44 is associated with receptor 30 and/or fuel rail 12. More particularly, in an alternate embodiment, receptor 30 is formed to have seat 80 disposed therein and also to have a threaded surface 82 proximate seat 80. In this embodiment, opening 38 of receptor 30 extends into seat 80. On the other hand, in this embodiment, injector 14 includes supporting member 46 and threaded portion 48 disposed at first end 94 thereof proximate injector inlet 98. Accordingly, as described above, seat 80, now part of receptor 30, is configured to receive second member 52 of supporting member 46, now associated with injector 14; and nut 48, now also associated with injector 14, is configured to be threaded onto threaded portion 82, now disposed on receptor 30. Therefore, first and second portions 42, 44 may be alternatively associated with either injector 14 or receptor 30, and thus, the description set forth above relating to first and second features 42, 44 and the constituent parts thereof applies to this embodiment with equal force.

Accordingly, in the exemplary embodiments described above wherein first and second features 42, 44 have complementary threaded portions, the mating of these portions create a compression fitting that serves to seal the coupling of fuel injector 14 and receptor 30, to reinforce the suspension of fuel injector 14, and to retain injector 14 in place in axial alignment with both fuel rail outlet 28 and combustion chamber 102. The axial alignment and the mating of features 42, 44 serve a number of purposes. First, when in axial alignment, injector outlet 100 engages the cylinder head and reaches the combustion chamber 102, which forces injector 14 into rigid alignment. Second, in a normal O-ring type joint, if the connection to fuel rail 12 is misaligned, injector side loading may result. This is due to the load applied to the fuel rail and injector as a result of the high pressure in the system (i.e., on the order of 10 MPa), which may cause the injector to want to "pop out" of the injector cup unless firmly secured to the cup/rail. Additionally, a load created by the combustion pressure resulting from a combustion event occurring in combustion chamber 102 is applied substantially coincident to the longitudinal axis of injector 14 (and, therefore, normal to axis 24 of rail 12) and can have the effect of causing a moment, such as a twisting moment, to be applied to injector 14 and/or fuel rail 12. Accordingly, the axial alignment combined with the rigid connection and seal formed by first and second features 42, 44 serves to prevent such occurrences, while also allowing some measure of misalignment.

Figure 9:
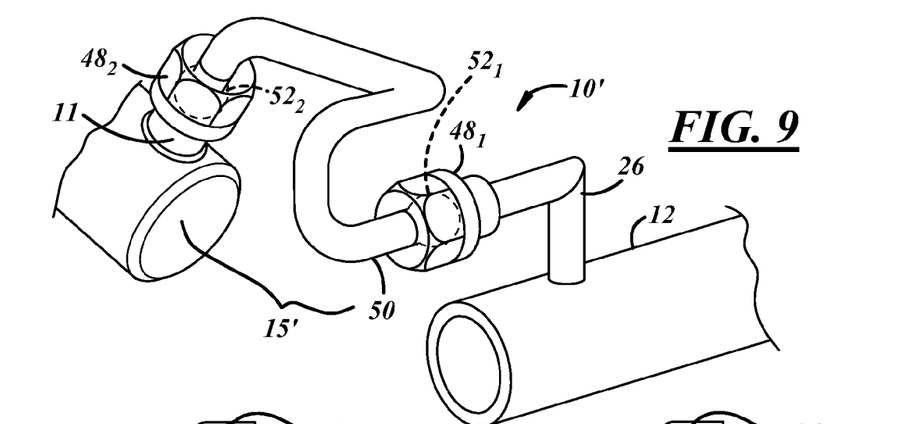
FIG. 9 is a perspective view of another exemplary embodiment of a fuel system in accordance with the present invention.

With reference to FIG. 9, another exemplary embodiment of fuel delivery system 10 (fuel delivery system 10') is illustrated wherein another exemplary embodiment of coupler 15 (coupler 15') is configured to couple fuel source 11 with fuel rail 12. It should be noted that coupler 15' may also be used in a fuel system having two fuel rails to couple the fuel rails together. Accordingly, the following description applies to such an application with equal force.

Figure 10:
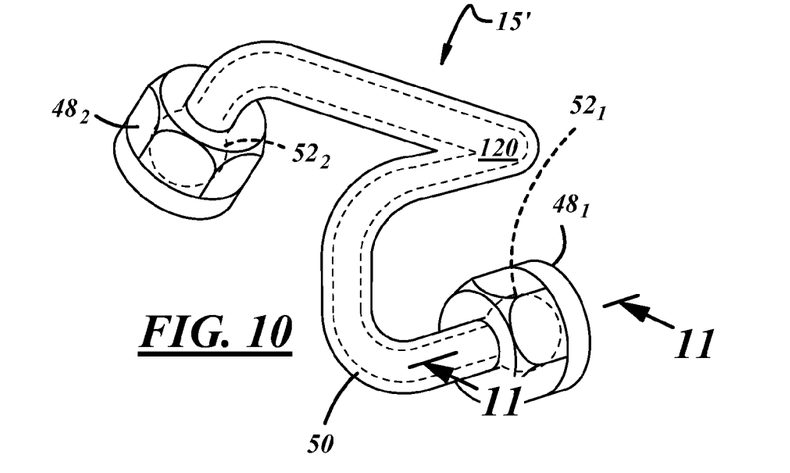
FIG. 10 is a perspective view of an exemplary embodiment of a coupling apparatus of the fuel delivery illustrated in FIG. 9.

As illustrated in FIGS. 9 and 10, coupler 15' comprises a first member 50, at least one second member 52, and one or more threaded portions taking the form of threaded nuts 48. In the illustrated embodiment, coupler 15' comprises two second members 52 ($52_1$, $52_2$) (or a second member $52_1$ and a third member $52_2$), and two threaded nuts 48 ($48_1$, $48_2$). It should be noted that while this embodiment of the present invention is described in greater detail below as having two second members and two threaded nuts, the present invention is not limited to such an arrangement. Rather, an embodiment of the invention having a single second member and a single threaded nut remains within the spirit and scope of the present invention. First and second portions 50 and 52 may be formed of any number of materials, such as, for example, stainless steel, aluminum, thermoplastics, or any other suitable materials.

Figure 11A:
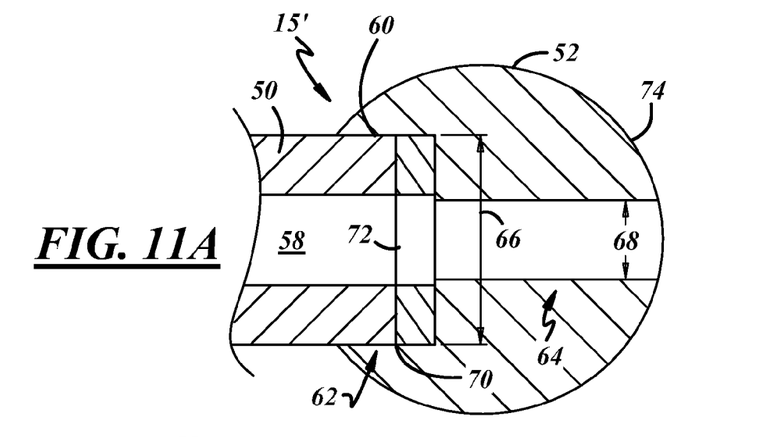
FIGS. 11A and 11B are cross-section views of exemplary embodiments of the coupling apparatus illustrated in FIG. 10 taken along the lines 11-11 in FIG. 10.

First member 50, which in an exemplary embodiment has a tubular shape, has a first end 54, a second end 56, and a throughgoing passageway 58 extending therebetween. First member 50 may be straight, or in another exemplary embodiment illustrated, for example, in FIGS. 9 and 10, may have one or more bends therein. As illustrated in FIG. 11A, each of second members $52_1$, $52_2$, which, in an exemplary embodiment, are spherically or ball shaped, have a throughgoing bore 60 (bores $60_1$, $60_2$, respectively). As described in greater detail above with respect to second member 52, in other exemplary embodiments, second members $52_1$, $52_2$ do not have a spherical shape, but rather have another shape, such as, for example, a conical or hemispherical shape. Each bore 60 is configured to receive either first end 54 or second end 56 of first member 50. In an exemplary embodiment, throughgoing bore $60_1$ is configured to receive first end 54 of first member 50, and bore $60_2$ is configured to receive second end 56 of first member 50. In an exemplary embodiment illustrated, for example, in FIG. 4, one or both of bores $60_1$, $60_2$ have a constant diameter throughout its length. However, as illustrated in FIG. 11A and as described above, in another exemplary embodiment, bores $60_1$, $60_2$ may each comprise a first portion 62 and a second portion 64. First portion 62 has a diameter 66 and second portion 64 has a diameter 68 that is smaller than diameter 64. In such an embodiment, first portion 62 defines a seat 70 configured to receive either first end 54 or second end 56 of first member 50. For the sake of simplicity of explanation only, the present invention will be described hereinafter with respect to the embodiment wherein bore 60 has first and second portions 62, 64 having first and second diameters 66, 68. However, while the following description is directed specifically to such an embodiment, it applies with equal force, where appropriate, to the embodiment described above wherein bore 60 has a constant diameter throughout.

Accordingly, first member 50 and second members $52_1$, $52_2$ are configured to be assembled and, as will be described in greater detail below, affixed together to create a rigid joint therebetween. When first member 50 and second members $52_1$, $52_2$ are assembled, passageway 58 and bores $60_1$, $60_2$ allow fuel to be communicated from fuel source 11 to fuel rail 12, or from fuel rail 12 to another fuel rail, as the case may be.

In an exemplary embodiment, first member 50 and second members $52_1$, $52_2$ are affixed together using known methods, such as, for example, various welding and/or brazing processes. With reference to FIG. 11A, in an embodiment wherein first member 50 and second members $52_1$, $52_2$ are brazed together, coupler 15' further includes a pair of brazing preforms 72. One preform 72 is configured to be disposed within bore $60_1$ at a position proximate where first end 54 of first member 50 would be disposed when it is inserted within bore $60_1$. Similarly, the other preform 72 is configured to be disposed within bore $60_2$ at a position therein proximate where second end 56 of first member 50 would be disposed when it is inserted within bore $60_2$. In an embodiment wherein bores $60_1$, $60_2$ include seats 70, preforms 72 may be disposed in the bottom of seats 70. Preforms 72 are configured and operative to affix first and second ends 54, 56 and the respective inner surfaces of bores $60_1$, $60_2$ together when a brazing operation is performed on the assembled components.

Figure 11B:
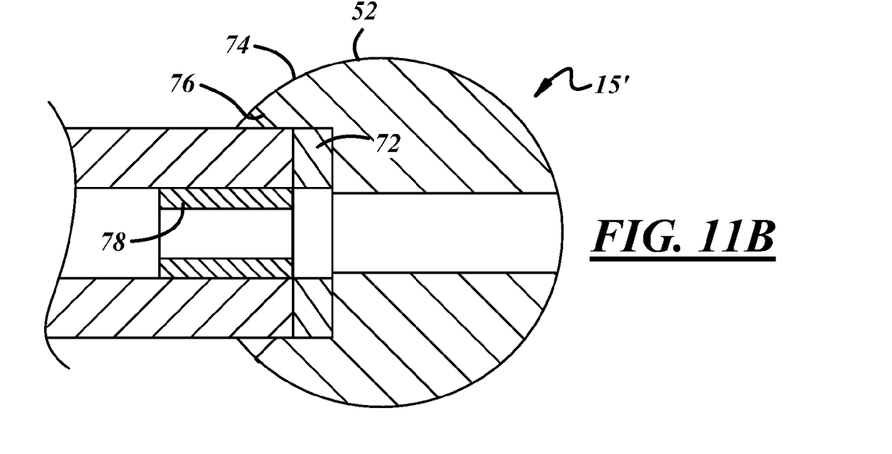

Additionally, with reference to FIG. 11B, second members $52_1$, $52_2$ each have an outer surface 74 that acts as a sealing surface. In an exemplary embodiment, one or both of second members $52_1$, $52_2$ may also include a chamfer 138 formed in the outer surface 74 thereof proximate bore $60_1$, $60_2$. Chamfer 138 is provided to act as a braze dam to prevent, or at least substantially limit, the amount of brazing material that may migrate onto outer surface 74, and therefore, onto the sealing surface of second member $52_1$/$52_2$.

As with fuel delivery system 10 described above, by second member 52 (i.e., ball or spherical form) receiving first member 50 (i.e., tubular form), the present invention eliminates the need for the shank and machining corresponding thereto that is required in conventional ball-style fittings.

With continued reference to FIG. 11B, coupler 15' may further include an insert sleeve 78. In an embodiment wherein coupler 15' includes a pair of second members 52, coupler 15' may include a pair of insert sleeves 78. Whether coupler 15' includes one or two insert sleeves, each insert sleeve 78 is configured to be inserted with passageway 58 of first member 50, and is operative to further strengthen and/or reinforce the joint between first member 50 and second member $52_1$/$52_2$. Accordingly, passageway 58 has a diameter that is sized to allow sleeve 78 to be inserted therein. In an exemplary embodiment, sleeve 78 is further configured to be affixed to the inner surface of passageway 58. In such an embodiment, sleeve 78 may be coated with a brazing material, such as, for example, copper. Additionally, in an embodiment wherein coupler 15' includes preform(s) 72, sleeve(s) 78 may be positioned within passageway 58 to be in contact with or in close proximity to respective preform(s) 72.

Sleeve 78 may take on any number of constructions and be formed of any number of materials. For instance, in an exemplary embodiment illustrated in FIG. 5C, sleeve 78 comprises a split-tube or roll pin construction. In such an embodiment the split-nature of the construction allows for a precise fit and tight tolerance within passageway 58. Sleeve 78 may be made of any number of materials, and in an exemplary embodiment, is formed of a metallic material (e.g., stainless steel).

With reference back now to FIG. 9, coupler 15' includes threaded nuts $48_1$, $48_2$. Nuts $48_1$, $48_2$ circumscribe, are slideable along, and are rotatable about first member 50. Nuts $48_1$, $48_2$ are retained on first member 50 by second members $52_1$, $52_2$ so as to prevent nuts $48_1$, $48_2$ from sliding off of first member 50. As was described with respect to coupler 15 above, coupler 15' is configured to be mated with a complementary feature 104 associated with each of the components that are being coupled together. Accordingly, if two fuel rails are being coupled together, each rail may have complementary feature 104 associated therewith. Similarly, if a fuel source and a fuel rail are being coupled together, the outlet of the fuel source and the inlet of the fuel rail may have complementary feature 104 associated therewith.

Figures 12, 13:
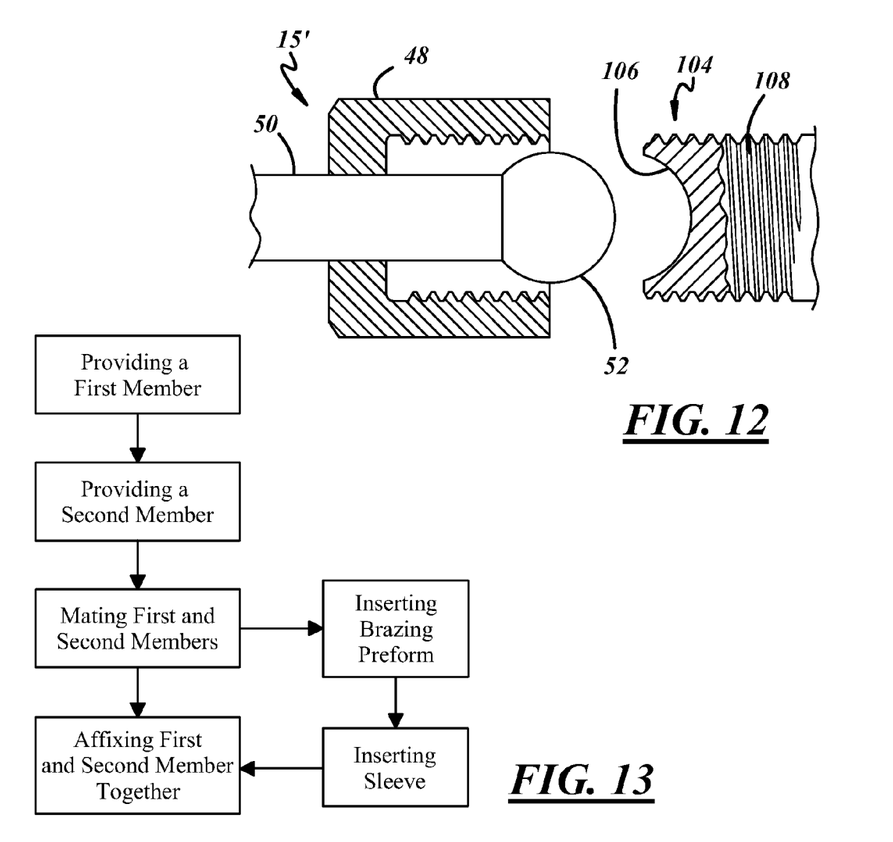
FIG. 12 is an enlarged perspective view of a portion of the fuel delivery system illustrated in FIG. 9.
FIG. 13 is a flow diagram illustrating a method of assembling an exemplary embodiment of a coupling apparatus of the present invention.

With reference to FIG. 12, in the illustrated embodiment, complementary feature 104, which is substantially identical to second feature 44 described above with respect to fuel delivery system 10, includes a seat 106 and a threaded portion 108. Seat 106 is sized and shaped to receive second member $52_1$, $52_2$ of coupler 15', and threaded portion 108 is configured to mate with the threaded portion of nut $48_1$, $48_2$. More particularly, in the illustrated embodiment, seat 106 is a conical seat sized to receive spherically-shaped second member 52, thereby creating a constant line of contact between second member 52 and seat 106; and threaded portion 108 of complementary feature 104 is configured to be mated with the inner threaded surface of nut 48 so as to create a compression fitting therebetween.

Accordingly, to couple fuel rail 12 to either another fuel rail or fuel source 11, wherein each component comprises complementary feature 104, coupler 15' is first assembled with fuel rail 12, for example, by inserting second member $52_1$ into seat 106 of complementary feature 104 associated with fuel rail 12. Threaded nut $48_1$ is then slid to first end 54 of first member 50 and threaded onto threaded portion 108 of complementary feature 104 associated with fuel rail 12. Next, coupler 15' is assembled with another fuel rail or fuel source 11 by inserting second member 52$_2$ into seat 106 of complementary feature 104 associated with the fuel rail or fuel source 11. Threaded nut 48$_2$ is then slid to second end 56 of first member 50 and threaded onto threaded portion 108 of complementary feature 104 associated with the other fuel rail or fuel source 11. It should be noted that the order of steps in the assembly process is provided for exemplary purposes only and is not meant to limit the invention to a process having such an order.

Accordingly, coupler 15/15' is configured to create a rigid connection between components of fuel delivery system 10 that is able to withstand the forces described above resulting from the high pressure in direct injection systems, while at the same time overcoming the drawbacks/disadvantages described above with respect to conventional coupling arrangements/techniques.

With reference to FIG. 13, a method of manufacturing coupler 15 will now be described. In a first step, a first member 50 having a first end 54, a second end 56, and throughgoing passageway 58 therebetween is provided. In a second step, a second member 52 having a throughgoing bore 60 configured to receive first end 54 of first member 50 is provided. In a third step, first end 54 of first member 50 is inserted into bore 60 of second member 52 such that first end 54 is seated within bore 60. In a fourth step, first member 50 and second member 52 are affixed together. More particularly, first end 54 and the inner surface of bore 60 are affixed together.

In an exemplary embodiment, the method further includes a fifth step, which must be performed prior to fourth step, comprising providing a brazing preform 72 and positioning preform 72 in bore 60. In an exemplary embodiment, the method may further include a sixth step comprising providing a sleeve 78, such as, for example, a split tube or roll pin; and a seventh step comprising placing sleeve 78 within said passageway 58.

While the invention has been particularly shown and described with reference to the preferred embodiments thereof, it is well understood by those skilled in the art that various changes and modifications can be made in the invention without departing from the spirit and scope of the invention.

The invention claimed is:

1. An apparatus for coupling components in a fuel delivery system together, comprising:
   a rigid first member having a first, distal end, a second, proximal end, and throughgoing passageway therebetween extending along an axis, said first member comprising an outer diameter, said first member having a first wall thickness defined between said passageway and said outer diameter;
   a second member having a throughgoing bore configured to receive said first distal end of said first member, said first and second members configured to be affixed together to create a rigid joint between said first end of said first member and said second member such that said passageway and said bore are in substantial alignment with each other, wherein said first and second members form a corner;
   an insert sleeve having a second wall thickness disposed in said passageway of said first member configured to reinforce said joint between said first member and said second member by increasing an overall thickness of material proximate said corner as taken in a radial direction to a sum of at least said first and second wall thicknesses, said insert sleeve extending axially beyond said corner in a direction toward said second, proximal end of said first member, said insert sleeve being a first axial length and having a constant outside diameter along said first axial length, said passageway having a constant inside diameter along a second axial length thereof wherein said first axial length and said second axial length overlap, said constant outside diameter corresponding to said constant inside diameter such that said constant outside diameter of said insert sleeve disposed in said passageway at said first, distal end of said first member contacts said constant inside diameter of said passageway, said first member having a third axial length that is greater than said first axial length of said insert sleeve; and
   a nut circumscribing said first member, said nut comprising a body having an aperture therein having a diameter sized relative to said outer diameter of said first member such that said nut is slidable along and rotatable about said first member;
   wherein said first member has a tubular shape and said second member has a spherical shape.

2. An apparatus in accordance with claim 1 wherein said bore comprises a first portion having a first diameter and a second portion having a second diameter less than said first diameter, said first portion defining a seat configured to receive said first end of said first member.

3. An apparatus in accordance with claim 1 wherein said insert sleeve comprises a roll pin having a split construction configured to allow a roll pin outside diameter thereof to vary according to a passageway inside diameter.

4. An apparatus in accordance with claim 3 wherein said roll pin is affixed to the inner surface of said passageway.

5. An apparatus in accordance with claim 2 wherein said second portion includes an outer surface and a chamfer formed in said outer surface proximate said bore.

6. An apparatus in accordance with claim 1 wherein said second end of said first member is affixed to one of a fuel rail and a fuel injector.

7. An apparatus in accordance with claim 1 wherein said second end of said first member is unitarily formed with one of a fuel rail and a fuel injector.

8. An apparatus in accordance with claim 1 wherein said throughgoing bore is a first throughgoing bore and said rigid joint is a first rigid joint, said apparatus further comprising a third member having a second throughgoing bore configured to receive said second end of said first member, said first and third members configured to be affixed together to create a second rigid joint between said second end of said first member and said third member such that said passageway of said first member and said second throughgoing bore of said third member are in substantial alignment with each other.

9. An apparatus in accordance with claim 8 wherein said third member has a spherical shape.

10. An apparatus in accordance with claim 8 further comprising:
    a first roll pin configured to be inserted within said passageway of said first member and to reinforce said first rigid joint between said first and second members; and
    a second roll pin configured to be inserted within said passageway of said first member and to reinforce said second rigid joint between said first and third members.

11. An apparatus in accordance with claim 1 further comprising a brazing preform configured to be positioned within said bore of said second member and operative to affix said first and second members together when a brazing process is performed thereon.

12. An apparatus for coupling components in a fuel delivery system together, comprising:
   a rigid first member having a first, distal end, a second, proximal end, and throughgoing passageway therebetween extending along an axis, said first member comprising an outer diameter, said first member having a first wall thickness defined between said passageway and said outer diameter;
   a second member having a throughgoing bore configured to receive said first distal end of said first member, said first and second members configured to be affixed together to create a rigid joint between said first end of said first member and said second member such that said passageway and said bore are in substantial alignment with each other, wherein said first and second members form a corner;
   an insert sleeve having a second wall thickness disposed in said passageway of said first member configured to reinforce said joint between said first member and said second member by increasing an overall thickness of material proximate said corner as taken in a radial direction to a sum of at least said first and second wall thicknesses, said insert sleeve extending axially beyond said corner in a direction toward said second, proximal end of said first member, said insert sleeve being a first axial length and having a constant outside diameter along said first axial length, said passageway having a constant inside diameter along a second axial length thereof wherein said first axial length and said second axial length overlap, said constant outside diameter corresponding to said constant inside diameter such that said constant outside diameter of said insert sleeve disposed in said passageway at said first, distal end of said first member contacts said constant inside diameter of said passageway, said first member having a third axial length that is greater than said first axial length of said insert sleeve;
   a nut circumscribing said first member, said nut comprising a body having an aperture therein having a diameter sized relative to said outer diameter of said first member such that said nut is slidable along and rotatable about said first member; and
   a brazing preform configured to be disposed within said bore.

13. A fuel delivery system comprising:
   a first component comprising a fuel rail, said first component including an inlet, an outlet, and a fluid passageway therebetween;
   a second component including one of a fuel source, a second fuel rail, and a fuel injector, said second component comprising an inlet and an outlet; and
   a coupling apparatus configured to couple one of said inlet and said outlet of said first component to one of said inlet and said outlet of said second component, said coupling apparatus comprising:
      a rigid first member having a first, distal end, a second, proximal end, and a throughgoing passageway therebetween extending along an axis, said first member comprising an outer diameter, said first member having a first wall thickness defined between said passageway and said outer diameter;
      a second member having a throughgoing bore configured to receive said first, distal end of said first member, said first and second members configured to be affixed together to create a rigid joint between said first member and said second member such that said passageway and said bore are in substantial alignment with each other, wherein said first and second members form a corner;
      an insert sleeve having a second wall thickness disposed in said passageway of said first member configured to reinforce said joint between said first member and said second member by increasing an overall thickness of material proximate said corner as taken in a radial direction to a sum of at least said first and second wall thicknesses, said insert sleeve extending axially beyond said corner in a direction toward said second, proximal end of said first member, said insert sleeve being a first axial length and having a constant outside diameter along said first axial length, said passageway having a constant inside diameter along a second axial length thereof wherein said first axial length and said second axial length overlap, said constant outside diameter corresponding to said constant inside diameter such that said constant outside diameter of said insert sleeve disposed in said passageway at said first, distal end of said first member contacts said constant inside diameter of said passageway, said first member having a third axial length that is greater than said first axial length of said insert sleeve; and
      a nut circumscribing said first member, said nut comprising a body having an aperture therein wherein said diameter of said aperture is sized relative to said outer diameter of said first member such that said nut is slidable along and rotatable about said first member, said body further comprising a threaded portion;
      wherein one of said first and second ends of said first member is configured to be associated with said first component, and the other of said first and second ends is configured to be associated with said second component, said one of said first and second components with which said first end of said first member is configured to be associated further comprising a threaded portion disposed proximate one of said inlet and said outlet thereof that is complementary with said threaded portion of said nut, and further wherein
      said threaded portion of said nut is configured to be mated with said threaded portion of said one of said first and second components in order to ensure and maintain substantial axial alignment of said passageway and said bore of said first and second members of said coupling apparatus, respectively, with said inlet or said outlet of said one of said first and said second components when said first and second threaded portions are mated; and
   wherein said coupling apparatus further comprises a brazing preform configured to be positioned within said bore of said second member and operative to affix said first and second members together when a brazing process is performed thereon.

14. A fuel delivery system comprising:
   a first component comprising a fuel rail, said first component including an inlet, an outlet, and a fluid passageway therebetween;
   a second component including one of a fuel source, a second fuel rail, and a fuel injector, said second component comprising an inlet and an outlet; and
   a coupling apparatus configured to couple one of said inlet and said outlet of said first component to one of said inlet and said outlet of said second component, said coupling apparatus comprising:
      a rigid first member having a first, distal end, a second, proximal end, and a throughgoing passageway therebetween extending along an axis, said first member comprising an outer diameter, said first member having a first wall thickness defined between said passageway and said outer diameter;

a second member having a throughgoing bore configured to receive said first, distal end of said first member, said first and second members configured to be affixed together to create a rigid joint between said first member and said second member such that said passageway and said bore are in substantial alignment with each other, wherein said first and second members form a corner;

an insert sleeve having a second wall thickness disposed in said passageway of said first member configured to reinforce said joint between said first member and said second member by increasing an overall thickness of material proximate said corner as taken in a radial direction to a sum of at least said first and second wall thicknesses, said insert sleeve extending axially beyond said corner in a direction toward said second, proximal end of said first member, said insert sleeve being a first axial length and having a constant outside diameter along said first axial length, said passageway having a constant inside diameter along a second axial length thereof wherein said first axial length and said second axial length overlap, said constant outside diameter corresponding to said constant inside diameter such that said constant outside diameter of said insert sleeve disposed in said passageway at said first, distal end of said first member contacts said constant inside diameter of said passageway, said first member having a third axial length that is greater than said first axial length of said insert sleeve; and a nut circumscribing said first member, said nut comprising a body having an aperture therein wherein said diameter of said aperture is sized relative to said outer diameter of said first member such that said nut is slidable along and rotatable about said first member, said body further comprising a threaded portion;

wherein one of said first and second ends of said first member is configured to be associated with said first component, and the other of said first and second ends is configured to be associated with said second component, said one of said first and second components with which said first end of said first member is configured to be associated further comprising a threaded portion disposed proximate one of said inlet and said outlet thereof that is complementary with said threaded portion of said nut, and further wherein said threaded portion of said nut is configured to be mated with said threaded portion of said one of said first and second components in order to ensure and maintain substantial axial alignment of said passageway and said bore of said first and second members of said coupling apparatus, respectively, with said inlet or said outlet of said one of said first and said second components when said first and second threaded portions are mated;

wherein said first member has a tubular shape and said second member has a spherical shape.

15. A fuel delivery system in accordance with claim 14 wherein said second component is a fuel injector having an inlet, an outlet, and a body, and wherein said fuel rail comprises said threaded portion of said one of said first and second components and said threaded portion is disposed proximate said outlet of said fuel rail, and further wherein said coupling apparatus is configured to couple said outlet of said fuel rail with said inlet of said fuel injector, and still further wherein said second member of said coupling apparatus is configured to be coupled with said fuel rail and said second end of said first member is associated with said fuel injector, and yet still further wherein said threaded portion of said body of said nut is configured to be mated with said threaded portion of said fuel rail in order to ensure and maintain substantial axial alignment of said passageway and said bore of said first and second members of said coupling apparatus, respectively, and said outlet of said fuel rail when said threaded portions are mated.

16. A fuel delivery system in accordance with claim 14 wherein said insert sleeve includes a roll pin configured to be inserted and disposed within said passageway of said first member, said roll pin operative to reinforce said joint between said first member and said second member.

17. A fuel delivery system in accordance with claim 14 wherein said second component is a fuel injector having an inlet, an outlet, and a body, said body comprising said threaded portion of said one of said first and second components and said threaded portion is disposed proximate said inlet of said fuel injector, and wherein said coupling apparatus is configured to couple said outlet of said fuel rail with said inlet of said fuel injector, and further wherein said second member of said coupling apparatus is configured to be coupled with said fuel injector and said second end of said first member is associated with said fuel rail, and still further wherein said threaded portion of said body of said nut is configured to be mated with said threaded portion of said fuel injector body in order to ensure and maintain substantial axial alignment of said passageway and said bore of said first and second members of said coupling apparatus, respectively, and said inlet of said fuel injector when said threaded portions are mated.

18. A fuel delivery system in accordance with claim 14 wherein said first component comprises a first fuel rail and said second component comprises a second fuel rail having an inlet, an outlet, and a fluid passageway therebetween, said coupling apparatus configured to couple said outlet of said first fuel rail with said inlet of said second fuel rail, and further wherein said first fuel rail comprises said threaded portion of said one of said first and second components and said threaded portion is disposed proximate said outlet thereof, and still further wherein said second member of said coupling apparatus is configured to be coupled with said first fuel rail, and said second end of said first member is associated with said second fuel rail, and yet still further wherein said threaded portion of said body of said nut is configured to be mated with said threaded portion of said first fuel rail in order to ensure and maintain substantial axial alignment of said passageway and said bore of said first and second members of said coupling apparatus, respectively, and said outlet of said first fuel rail when said threaded portions are mated.

19. A fuel delivery system in accordance with claim 14 wherein said first component comprises a first fuel rail and said second component comprises a second fuel rail having an inlet, an outlet, and a fluid passageway therebetween, said coupling apparatus configured to couple said outlet of said first fuel rail with said inlet of said second fuel rail, and further wherein said second fuel rail comprises said threaded portion of said one of said first and second components and said threaded portion is disposed proximate said inlet thereof, and still further wherein said second member of said coupling apparatus is configured to be coupled with said second fuel rail, and said second end of said first member is associated with said first fuel rail, and yet still further wherein said threaded portion of said body of said nut is configured to be mated with said threaded portion of said second fuel rail in order to ensure and maintain substantial axial alignment of said passageway and said bore of said first and second members of said coupling apparatus, respectively, and said inlet of said second fuel rail when said threaded portions are mated.

20. A fuel delivery system in accordance with claim 14 wherein said second component comprises a fuel source having an outlet, said coupling apparatus configured to couple said outlet of said fuel source with said inlet of said fuel rail, and further wherein said fuel rail comprises said threaded portion of said one of said first and second components and said threaded portion is disposed proximate said inlet thereof, and still further wherein said second member of said coupling apparatus is configured to be coupled with said fuel rail, and said second end of said first member is associated with said fuel source, and yet still further wherein said threaded portion of said body of said nut is configured to be mated with said threaded portion of said fuel rail in order to ensure and maintain substantial axial alignment of said passageway and said bore of said first and second members of said coupling apparatus, respectively, and said inlet of said fuel rail when said threaded portions are mated.

21. A fuel delivery system in accordance with claim 14 wherein said second component comprises a fuel source having an outlet, said coupling apparatus configured to couple said outlet of said fuel source with said inlet of said fuel rail, and further wherein said fuel source comprises said threaded portion of said one of said first and second components and said threaded portion is disposed proximate said outlet thereof, and still further wherein said second member of said coupling apparatus is configured to be coupled with said fuel source, and said second end of said first member is associated with said fuel rail, and yet still further wherein said threaded portion of said body of said nut is configured to be mated with said threaded portion of said fuel source in order to ensure and maintain substantial axial alignment of said passageway and said bore of said first and second members of said coupling apparatus, respectively, and said outlet of said fuel source when said threaded portions are mated.

22. A fuel delivery system in accordance with claim 14 further comprising a brazing preform configured to be positioned within said bore of said second member and operative to affix said first and second members together when a brazing process is performed thereon.

* * * * *